United States Patent
Seibl

(10) Patent No.: US 7,584,654 B2
(45) Date of Patent: Sep. 8, 2009

(54) ROLLER BRAKE TESTING DYNAMOMETER

(75) Inventor: Erich Seibl, Tüssling (DE)

(73) Assignee: Snap-On Equipment GmbH, Pfungstadt (DE)

( * ) Notice: Subject to any disclaimer, the term of this patent is extended or adjusted under 35 U.S.C. 154(b) by 102 days.

(21) Appl. No.: 11/826,991

(22) Filed: Jul. 19, 2007

(65) Prior Publication Data
US 2008/0028845 A1 Feb. 7, 2008

(30) Foreign Application Priority Data
Jul. 19, 2006 (DE) ................ 20 2006 011 246 U

(51) Int. Cl.
*G01L 5/28* (2006.01)
(52) U.S. Cl. ........................................ 73/123
(58) Field of Classification Search ........... 73/116.08, 73/118.01, 121, 123, 126
See application file for complete search history.

(56) References Cited

U.S. PATENT DOCUMENTS

| | | | |
|---|---|---|---|
| 3,832,894 A | | 9/1974 | Pelta |
| 3,899,916 A | * | 8/1975 | Cline ........................ 73/126 |
| 3,982,429 A | * | 9/1976 | Cline ........................ 73/126 |
| 4,024,756 A | * | 5/1977 | Cline ........................ 73/132 |
| 4,161,116 A | | 7/1979 | Fegraus et al. |
| 4,327,578 A | | 5/1982 | D'Angelo |
| 4,520,444 A | * | 5/1985 | Koos ........................ 701/70 |
| 4,893,242 A | * | 1/1990 | Rogers et al. ............... 701/70 |
| 5,148,703 A | * | 9/1992 | Vaughan et al. ............. 73/123 |
| 5,795,990 A | * | 8/1998 | Gitis et al. .................. 73/9 |
| 5,945,598 A | * | 8/1999 | Enright ...................... 73/123 |
| 6,257,054 B1 | * | 7/2001 | Rostkowski et al. ...... 73/116.08 |
| 6,332,354 B1 | * | 12/2001 | Lalor et al. .................. 73/121 |
| 6,439,351 B1 | * | 8/2002 | Sanitate et al. .............. 188/72.4 |
| 6,601,445 B2 | * | 8/2003 | Cordes ....................... 73/123 |
| 6,860,145 B2 | * | 3/2005 | Bergst et al. ................. 73/123 |
| 7,392,693 B2 | * | 7/2008 | Wimmer ..................... 73/123 |
| 2002/0125770 A1 | * | 9/2002 | Hessmert et al. ............. 303/191 |

FOREIGN PATENT DOCUMENTS

| | | |
|---|---|---|
| DE | 2 036 109 | 4/1971 |
| DE | 22 40 319 | 2/1974 |
| DE | 27 38 325 C 3 | 3/1978 |
| DE | 30 08 901 A 1 | 7/1981 |
| DE | 199 53 464 A 1 | 5/2001 |
| DE | 201 19 617 U 1 | 3/2002 |

* cited by examiner

*Primary Examiner*—Lisa M Caputo
*Assistant Examiner*—Freddie Kirkland, III
(74) *Attorney, Agent, or Firm*—McDermott Will & Emery LLP

(57) ABSTRACT

The present invention relates to a roller brake testing dynamometer (P) for vehicles whose braking forces are to be ascertained, wherein there is provided at least one roller (L) which is driven by way of a drive (A) in order in turn to drive a vehicle tire (R) bearing against the roller (L), wherein there is provided at least one braking force sensor (S) for ascertaining a braking force exerted on the roller (L) by the tire (R), and wherein there is provided an evaluation and control unit (E) to which the signals of the braking force sensor (S) can be fed. Furthermore, it is provided that the evaluation and control unit (E) is adapted on the basis of the signals from the braking force sensor (S) to ascertain the transition from static friction to sliding friction between the tire (R) and the roller (L) independently of the speed of rotation of the roller.

4 Claims, 2 Drawing Sheets

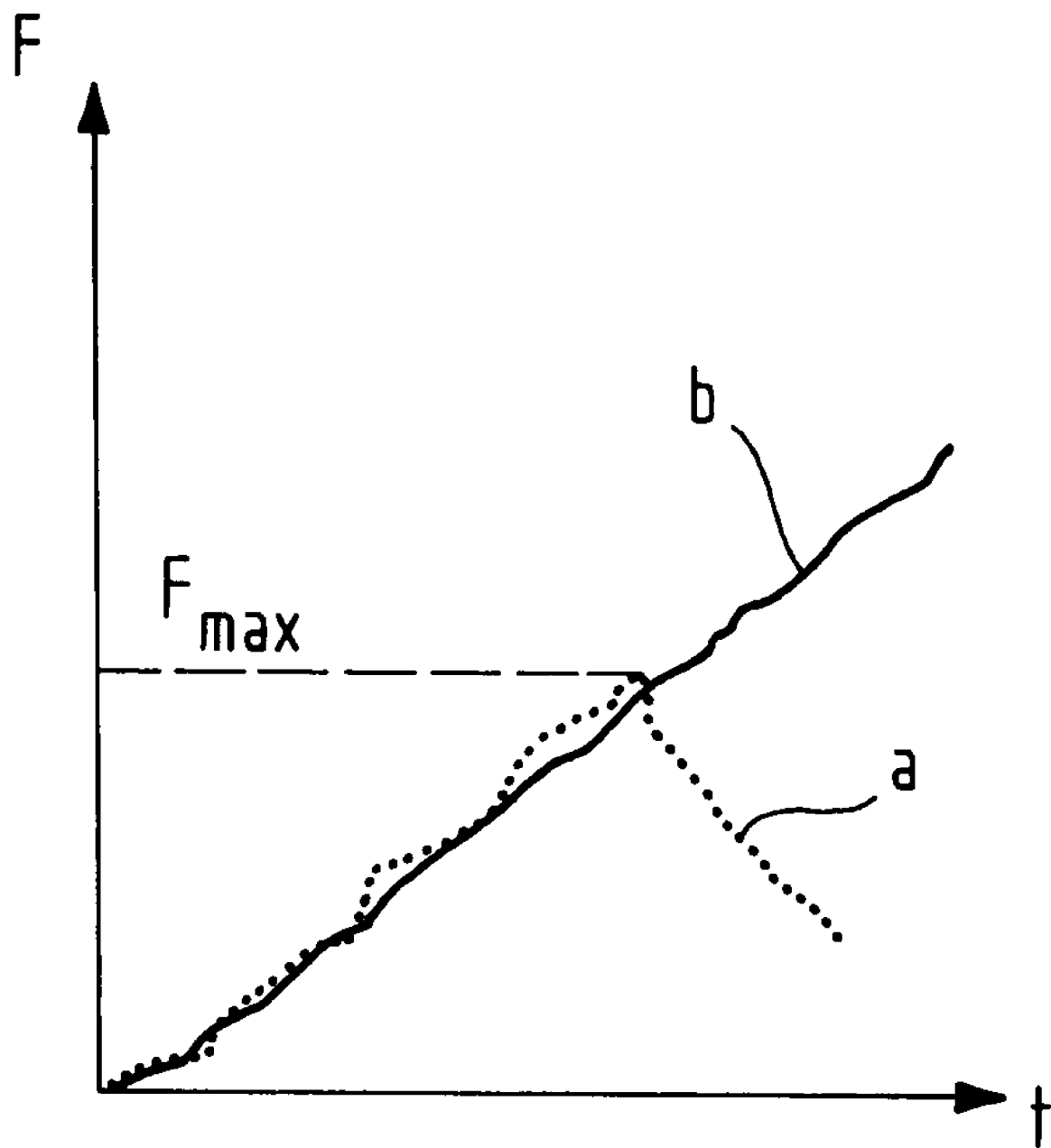

ROLLER BRAKE TESTING DYNAMOMETER

The present invention concerns a roller brake testing dynamometer for vehicles whose braking forces are to be ascertained.

Roller braking test dynamometers of that kind have long been known from the state of the art. They typically have two rollers which are arranged in parallel relationship and on to which the vehicle to be tested drives. When that happens a vehicle tyre comes to lie above or between the rollers. When driving into the dynamometer the vehicle tyre comes into contact in that case with a further so-called sensing roller which is supported resiliently against a switch and which switches on the brake testing operation upon being loaded by the vehicle tyre. In addition the sensing roller serves to record the rotary speed of the vehicle tyre which is driven by one of the two rollers, and to feed it to an evaluation station. At the same time the rotary speed of the driving roller is also monitored. As soon as the rotary speed of the vehicle tyre which is being braked to an ever increasing extent differs from the rotary speed of the driving roller (the braking action is therefore sufficiently great to cause slippage between the roller and the tyre) that difference in rotary speed is detected by the evaluation unit and used for further control of the brake testing dynamometer or for switching off the roller drive.

The structural configuration of the known dynamometers with sensing rollers of that kind is complicated and expensive. The operation of ascertaining the rotary speed of the driven vehicle tyre, which is implemented by way of the sensing roller, also requires a high level of complication and expenditure in terms of a sensor system and involves an evaluation or control action which is correspondingly susceptible to trouble.

Therefore the object of the invention is to provide a roller brake testing dynamometer which is particularly easy to construct and which at the same time reduces the complication and expenditure in terms of sensors.

That object is attained by a roller brake testing dynamometer as set forth in claim 1.

The invention is based on the realisation that the braking force which is actually relevant can be ascertained or actuation of the dynamometer can be carried out without the rotary speed of the driven vehicle tyre having to be detected for that purpose. In accordance with the invention, the braking force between the drive roller and the vehicle tyre, which in accordance with the state of the art is ascertained in known manner, is also evaluated by a suitable evaluation and control unit to ascertain whether it assumes unexpected values in its variation and in particular abruptly decreases.

In that respect 'unexpected' or 'unwanted' is to be interpreted as meaning that the abrupt change is not caused by operating personnel at a given moment in time or actively and deliberately (which would be the case for example due to an abruptly reduced pressure on the brake pedal of the vehicle to be tested).

Thus, by virtue of precise evaluation of the detected braking force, it is possible for example to detect the transition from static friction to sliding friction between the driving roller and the driven vehicle as the coefficients of friction of static friction and sliding friction are different.

Thus the braking force detected by way of a suitable sensor will increase after the beginning of the testing procedure and with an ever increasing braking action in respect of the vehicle tyre until the braking force is sufficiently great to hold the vehicle tyre stationary with respect to the driving roller. At that moment the static friction between the roller and the tyre becomes sliding friction. In that case the differing coefficients of friction have the result that the braking force sensor measures a falling or lower braking force at the transition to sliding friction. That fall or change alone is sufficient in that respect to ascertain the maximum value of the braking force achieved as the pattern of braking force changes correspondingly with the transition to sliding friction. That change on the one hand can be represented visually and on the other hand it can be converted into suitable control signals by suitable evaluation algorithms.

Accordingly the brake testing dynamometer can advantageously dispense with rotary speed monitoring of the vehicle tyre and the driving roller, as was hitherto required. A further advantage is that this also makes it possible to save on the previously known sensing roller insofar as the latter was used for providing information about the rotary speed. That means that the structural complication and expenditure of the brake testing dynamometer is advantageously reduced and evaluation is less susceptible to error because of the reduced number of sensors (only at least one braking force sensor is required).

A roller brake testing dynamometer in accordance with the invention therefore includes at least one roller which is driven by way of a drive in order in turn to drive a vehicle tyre which is bearing against the roller. There is provided at least one braking force sensor which is intended to serve to ascertain a braking force exerted on the roller by the tyre. Furthermore in accordance with the invention there is provided an evaluation and control unit to which the signals of the braking force sensor can be fed. In accordance with the invention the evaluation and control unit is adapted on the basis of the signals from the braking force sensor to determine the transition from static friction to sliding friction, wherein that takes place irrespective of the rotary speed of the vehicle tyre and the roller. The transition from static friction to sliding friction can be ascertained solely by monitoring the braking force or the variation in braking force in respect of time, in the manner set forth hereinbefore. When the transition occurs the control unit can switch off the drive for the roller in order to prevent ongoing sliding friction and thus local wear of the vehicle tyre.

In accordance with the invention, instead of ascertaining the transition from static friction to sliding friction, the evaluation and control unit can be designed generally for evaluating the braking force, in which case actuation of the drive is to be possible when an unwanted change in the braking force or the pattern of the braking force outside a predeterminable tolerance is detected. That provides that a control signal can be generated at any unwanted change in the braking force or the pattern in respect of the braking force, by the evaluation and control unit. That control signal can be used as an alarm signal, as a shut-down signal for the drive or in any other form. Advantageously therefore—once again without any influence in respect of the rotary speeds of the roller and the tyre—it is possible to provide for control of the brake testing dynamometer, even if the braking force for example abruptly rises, oscillates or exhibits other unwanted phenomena.

Implementation of a brake testing operation with a brake testing dynamometer according to the invention can in that case take place in such a way that, after the brake testing procedure is started, the pattern of the braking force is recorded while the braking force exerted by the vehicle is increasingly raised. If the braking force is sufficient to decelerate or stop the vehicle tyre relative to the driving roller (if therefore a substantial or sufficient change in the braking force is measured by virtue of altered coefficients of friction) then the evaluation and control unit can automatically implement shut-down of the drive after ascertaining that braking force value which has changed (not by direct intervention on the part of the operator). At the same time the desired braking force value which is reached as a maximum, under static friction conditions, can be stored, outputted or subjected to further processing in another fashion. That sequence considerably facilitates the testing procedures known hitherto. It will be appreciated that shut-down of the drive can also be triggered automatically when the braking force assumes another unexpected value or a value outside predeterminable tolerances.

In accordance with the invention the roller brake testing dynamometer provides in particular that the evaluation and control unit is adapted to switch off the drive if the braking force falls beyond a predeterminable tolerance magnitude. Particularly when simultaneously subjecting two tyres of a vehicle to a brake testing procedure, that fall initially occurs at one of the two tyres while the second tyre is still being driven without any slippage worth mentioning. The braking forces of the two tyres therefore exhibit markedly differing configurations from that moment in time. In accordance with the invention that is evaluated and it is ascertained in that respect that the braking force does not fall simultaneously at both tyres (which for example would be the case if the operator had reduced the pressure on the brake pedal). Therefore the fall in braking force at the first tyre can be evaluated there as a transition from static friction to sliding friction. That fall should be the typical pattern in respect of the braking force, which is regularly to be expected, as also occurs in accordance with the known testing processes. In accordance with the invention the dynamometer can then be shut down reliably and sufficiently quickly automatically, that is to say without action on the part of the operator, in order to prevent tyre damage.

Further advantageous embodiments of the invention are set forth in the appendant claims.

An embodiment of a roller brake testing dynamometer according to the invention is described in greater detail hereinafter with reference to two Figures in which:

FIG. 2 shows a typical graph of a braking force pattern in respect of two tyres.

Figure 1:
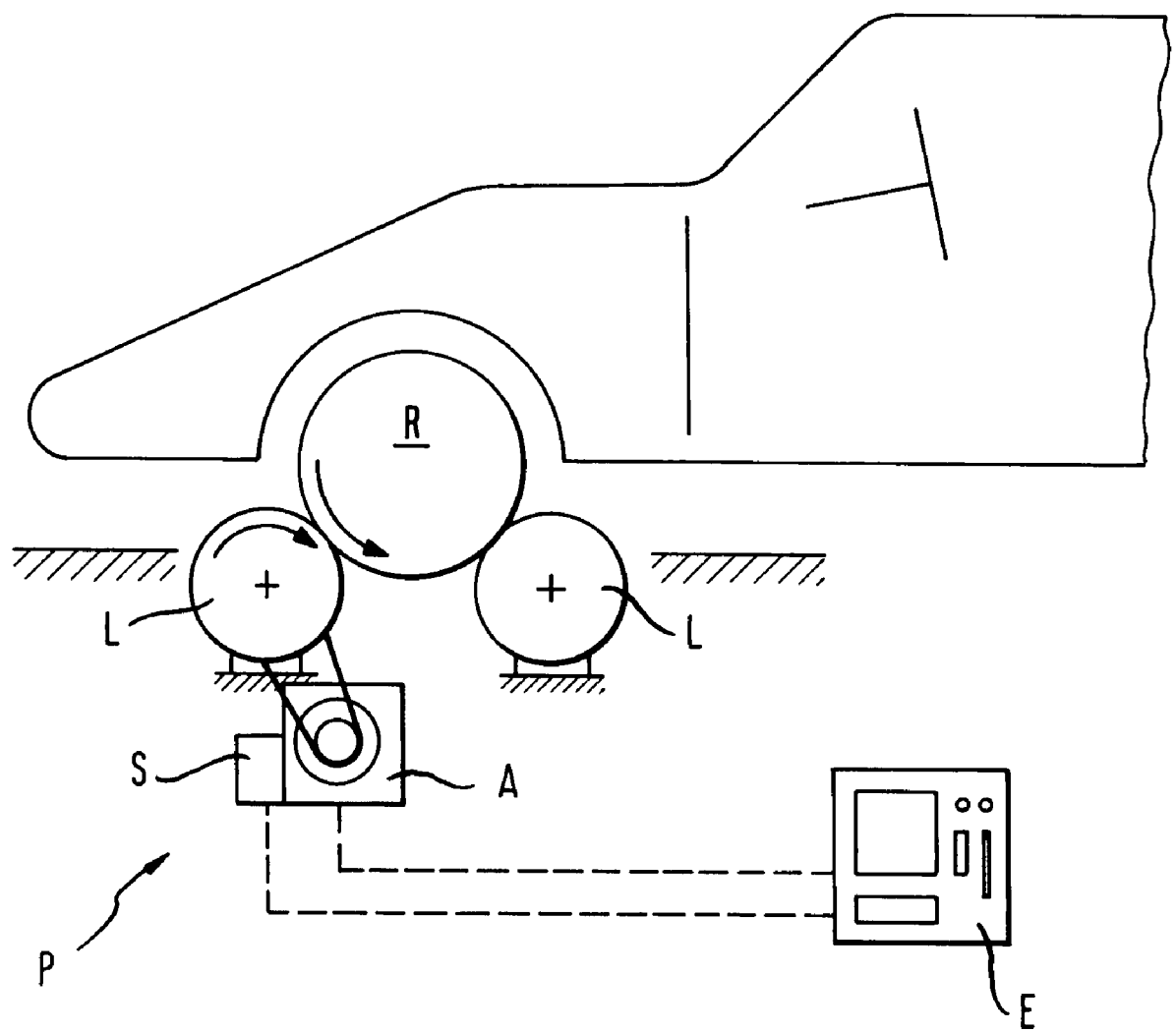
FIG. 1 shows a diagrammatic view of the essential components.

FIG. 1 is a diagrammatic side view showing a vehicle which is resting with its vehicle tyre R on two rollers L of the dynamometer P. The roller L shown at the left in FIG. 1 is drivable by way of a diagrammatically illustrated drive A in order in turn to cause the vehicle tyre R to rotate. There is also provided a braking force sensor S which in per se known manner detects the force required to drive the left-hand roller L, or the resistance opposed thereto.

The braking force sensor S and the drive A are connected to an evaluation and control unit E. The control unit E is adapted in dependence on the incoming signal from the braking force sensor S to output control signals which in particular also embrace shut-down of the drive A.

FIG. 2 shows a typical braking force pattern in respect of two vehicle tyres which are being tested at the same time in the context of a brake testing procedure, in simplified form. In this case the continuous line 'b' shows the braking force pattern in respect of the second vehicle tyre in relation to time t. In this case the braking force steadily increases, in which respect no particular aspects are to be noted over the entire configuration of the curve 'b'.

The line 'a' shown as a dotted line in contrast shows the pattern in respect of time of the braking force relating to the first vehicle tyre, which up to the value $F_{max}$ is of a substantially similar configuration to the curve 'b'. After that maximum value is reached however the curve 'a' falls abruptly and markedly. That leads to the conclusion that the vehicle tyre was sufficiently greatly braked at that moment in time so that the driving roller continued to rotate relative to the first vehicle tyre and the original static friction became sliding friction. In contrast the second tyre in accordance with curve 'b' is further braked without any slippage or drop in braking force worth mentioning. Evaluation of that abrupt and single-sided drop (which is thus not caused for example by the operator) by the evaluation and control unit permits the brake testing dynamometer to be of a simple configuration according to the invention and permits simple evaluation of the braking forces ascertained and shut-down of the drive or the brake testing dynamometer as quickly as possible (it should be noted that the curve configuration shown in FIG. 2 is only to be interpreted in qualitative terms and does not reproduce a force pattern which is true to scale).

The invention claimed is:

1. A roller brake testing dynamometer (P) for vehicles whose braking forces are to be ascertained,
   a) wherein there is provided at least one roller (L) which is driven by way of a drive (A) in order in turn to drive a vehicle tyre (R) bearing against the roller (L),
   b) wherein there is provided at least one braking force sensor (S) for ascertaining a braking force exerted on the roller (L) by the tyre (R), and
   c) wherein there is provided an evaluation and control unit (E) to which the signals of the braking force sensor (S) are fed,
   characterised in that
   d) the evaluation and control unit (E) is adapted on the basis of the signals from the braking force sensor (S) to ascertain the transition from static friction to sliding friction between the tyre (R) and the roller (L) independently of the speed of rotation of the roller.

2. A roller brake testing dynamometer according to claim 1 characterised in that the dynamometer is provided for simultaneous brake testing of a plurality of vehicle tyres of a vehicle and the evaluation and control unit (E) is adapted to switch off the drive (A) if the braking force of a first vehicle tyre falls in relation to that of a second tyre beyond a predeterminable tolerance magnitude.

3. A roller brake testing dynamometer (P) for vehicles whose braking forces are to be ascertained,
   a) wherein there is provided at least one roller (L) which is driven by way of a drive (A) in order in turn to drive a vehicle tyre (R) bearing against the roller (L),
   b) wherein there is provided at least one braking force sensor (S) for ascertaining a braking force exerted on the roller (L) by the tyre (R), and
   c) wherein there is provided an evaluation and control unit (E) to which the signals of the braking force sensor (S) are fed,
   characterised in that
   d) the evaluation and control unit (E) is adapted on the basis of the signals from the braking force sensor (S) and independently of the rotary speed of the roller (L) or the tyre (R)
   a) to evaluate the ascertained braking force and/or
   b) to actuate the drive (A) if an unwanted change in the braking force or the pattern of the braking force outside a predeterminable tolerance is ascertained.

4. A roller brake testing dynamometer according to claim 3 characterised in that the dynamometer is provided for simultaneous brake testing of a plurality of vehicle tyres of a vehicle and the evaluation and control unit (E) is adapted to switch off the drive (A) if the braking force of a first vehicle tyre falls in relation to that of a second tyre beyond a predeterminable tolerance magnitude.

* * * * *